UNITED STATES PATENT OFFICE.

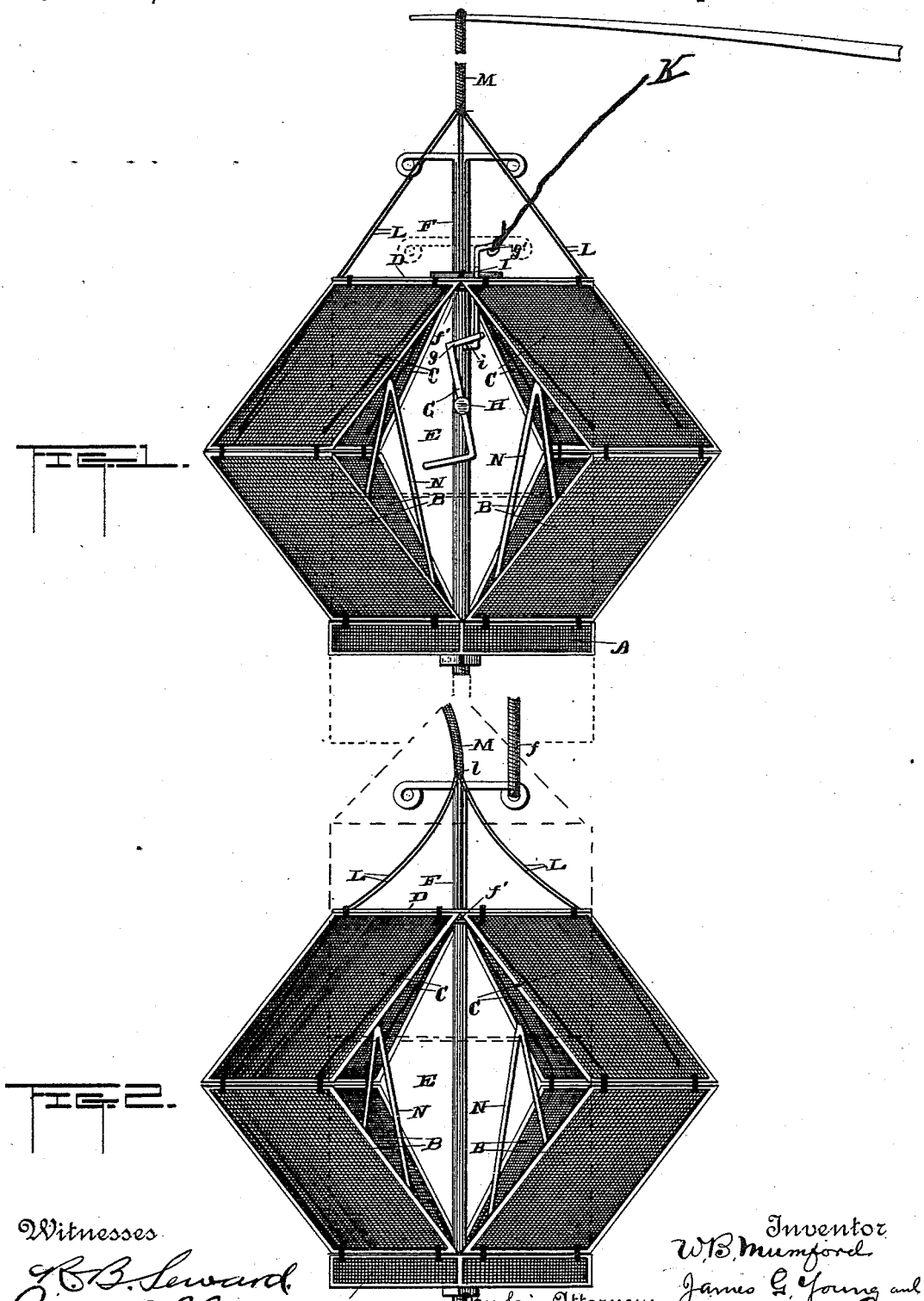

WILLIAM B. MUMFORD, OF KANSAS CITY, MISSOURI.

FISH-TRAP.

SPECIFICATION forming part of Letters Patent No. 424,494, dated April 1, 1890.

Application filed October 22, 1889. Serial No. 327,780. (No model.)

*To all whom it may concern:*

Be it known that I, WILLIAM B. MUMFORD, a citizen of the United States, residing at Kansas City, in the county of Jackson and State of Missouri, have invented certain new and useful Improvements in Fish-Traps; and I do hereby declare the following to be a full, clear, and exact description of the invention, such as will enable others skilled in the art to which it appertains to make and use the same.

My invention relates to an improvement in fish-traps.

The object is to provide a trap adapted to catch fish (several at a time) with the use of bait, and which may be manipulated from the end of a pole or from the float, or which may be set and sprung by the animal taking the bait.
A further object is to provide a simple and inexpensive trap which may be knocked down and packed away in a small compass and readily set up again for use.

With these ends in view my invention consists in certain features of construction and combinations of parts, as will be hereinafter described, and and pointed out in the claims.

In the accompanying drawings, Figure 1 represents the trap suspended from a pole or float and open or set for the entrance of fish, the trap being suspended by a cord attached to the folding portion of the trap and the trap held in its open adjustment by triggers. Fig. 2 represents the same suspended by the central standard, the closing being effected by drawing upon the cord attached to the folding portion. In both this figure and Fig. 1 the dotted lines represent the positions of the parts when the trap is closed.

The body of the trap consists of a bottom portion A, preferably of rectangular form, and comprises a closed bottom and four sides formed of wire-netting. To the upper edges of the four sides of the bottom portion A four rectangular flaps B, of wire-gauze, are hinged so as to fold freely outward and inward. To the upper edges of the four flaps B the four upper flaps C, also of wire-gauze, are hinged, the upper edges of the four flaps C being hinged to the four sides of the rectangular top D of the trap. The construction is such that as the top D is depressed toward the bottom portion A the meeting edges of the upper and lower flaps C and B will be forced upwardly away from the vertical axis of the trap, leaving open spaces E between the adjacent side edges of the flaps, as shown in the figures, full lines. To hold the parts in their relative adjustments and to form a support for the attachment of bait, and to further provide means for manipulating the trap, a central rod extends from the bottom of the trap up through the top and projects a short distance above the top for the attachment of an operating-cord. This rod is denoted in the drawings by the letter F and the cord attached thereto by $f$. The rod F is either squared when it passes through the top or bottom or is keyed to the bottom in any well-known and approved manner to prevent the flap from rotating on the rod. The said rod F is further provided with a stop $f'$ to limit the downward movement of the top and hence the opening of the trap. To the rod F is attached the spit G, preferably by means of a screw H, on the stem of which the spit is pivoted. The lower end of the spit is adapted to receive the bait, and the upper end $g$ is of hook form to engage the trigger I. The trigger I is secured to the top of the trap, so as to admit of a free rocking movement, and its lower end $i$ is of hook form to engage the hooked end $g$ of the spit, while its upper end is of bent form, as shown, and conveniently provided with an eye $g'$ for the attachment of the operating-cord K.

Suspending cords or wires L are attached to the upper flaps C near their lower edges, and extend thence up through the top D and are united at a point $l$, at which an operating-cord M is attached, as shown. To prevent the flaps from swinging inwardly too far, I find it convenient to provide skeleton standards N, preferably formed by bending a piece of wire into V shape and securing its ends to the bottom portion A.

The operation is as follows: Suppose the trap to be set in open adjustment, as shown in Fig. 1, and suspended from a pole or float by the cord M, the trigger in engagement with the spit. The trap will be sprung by a pull upon the cord K, which will immediately set the top of the trap free to slide up along the rod F; or, more properly, the weight of the trap will draw the rod F down through the trap and close its sides. The pull of the fish at the bait on the spit would also accomplish the closure of the trap in the same manner. When the trap is suspended by the cord attached to the rod F, the weight of the top and flaps will tend to hold it open, and it may be closed at pleasure by a pull upon the cord M, attached to the flaps or top.

The hinges which connect the flaps with each other and with the top and bottom may be of any simple form—such, for example, as a bent wire-ring, as shown—and may be readily removed and the parts separated and packed flatly, while the rod F, by means of its removable nut or key, which fastens it to the bottom, and the removable screw and stop may be withdrawn from the top and bottom and packed compactly therewith. The stops N may also be removed and packed with the other parts.

It is evident that various slight changes might be resorted to in the form and arrangement of the several parts described without departing from the spirit and scope of my invention. Hence I do not wish to limit myself strictly to the construction herein shown; but,

Having thus fully described my invention, what I claim as new, and desire to secure by Letters Patent, is—

1. In a fish-trap, a top and bottom, flaps connecting the top and bottom, each flap consisting of sections hinged together and hinged to the top and bottom, and means for operating said trap, substantially as set forth.

2. In combination, the top and bottom connected by pairs of hinged flaps, each flap consisting of sections hinged together and to the top and bottom, a central rod extending from the bottom through the top, an operating-cord connected with the central rod, and an operating-cord connnected with the top, the top having a free sliding movement on the rod, substantially as set forth.

3. In combination, the top and bottom connected by pairs of hinged flaps, a central rod extending from the bottom loosely through the top, a bait-spit pivoted to the rod, a trigger pivotally secured to the top and adapted to engage the spit, an operating-cord connected to the trigger, and an operating-cord connected to the top, substantially as set forth.

4. In combination, the top and bottom connected by hinged flaps, each flap consisting of sections hinged together and to the top and bottom, stops projecting upwardly from the bottom to limit the inward movement of the flaps, the central rod, and the operating-cords, substantially as set forth.

In testimony whereof I have affixed my signature in presence of two witnesses.

WILLIAM B. MUMFORD.

Witnesses:
 BESSIE E. YOUNG,
 C. J. GALLAGHER.